(12) United States Patent
Cadalen (10) Patent No.: US 8,863,587 B2
(45) Date of Patent: Oct. 21, 2014

(54) METHOD FOR DETERMINING THE FLOW RATES OF A FIRST GAS PHASE AND AT LEAST ONE SECOND LIQUID PHASE PRESENT IN A POLYPHASIC FLUID

(75) Inventor: Sébastien Cadalen, Le Blanc Mesnil (FR)

(73) Assignee: Geoservices Equipements, Roissy en France (FR)

( * ) Notice: Subject to any disclaimer, the term of this patent is extended or adjusted under 35 U.S.C. 154(b) by 603 days.

(21) Appl. No.: 13/121,126

(22) PCT Filed: Sep. 24, 2009

(86) PCT No.: PCT/FR2009/051806
§ 371 (c)(1),
(2), (4) Date: Apr. 29, 2011

(87) PCT Pub. No.: WO2010/034939
PCT Pub. Date: Apr. 1, 2010

(65) Prior Publication Data
US 2012/0132010 A1    May 31, 2012

(30) Foreign Application Priority Data
Sep. 25, 2008  (FR) ...................................... 08 56466

(51) Int. Cl.
*G01F 1/74*    (2006.01)
*G01F 25/00*   (2006.01)
*G01F 1/44*    (2006.01)

(52) U.S. Cl.
CPC .............. *G01F 1/74* (2013.01); *G01F 25/0007* (2013.01); *G01F 1/44* (2013.01)
USPC ...................................................... 73/861.04

(58) Field of Classification Search
CPC ............................... G01F 25/0007; G01F 1/74

USPC .......................................... 702/45; 73/861.04
See application file for complete search history.

(56) References Cited

U.S. PATENT DOCUMENTS 7,240,568 B2 * 7/2007 Atkinson .................... 73/861.63
7,380,918 B2 * 6/2008 Dean et al. ...................... 347/82
(Continued)

FOREIGN PATENT DOCUMENTS

| EP | 0076882 | 4/1983 |
| RU | 2301887 C2 | 6/2007 |
| WO | 89/02066 | 3/1989 |

OTHER PUBLICATIONS

Decision on grant for the equivalent Russian patent application No. 2011116192 issued on Apr. 2, 2013.

Primary Examiner — Jonathan C Teixeira Moffat
Assistant Examiner — Joseph J Yamamoto
(74) Attorney, Agent, or Firm — Cameron R. Sneddon (57) ABSTRACT

A method for determining a first flow rate of a gas phase and a second flow rate of at least one liquid phase present in a polyphasic fluid circulating in a conduit is presented. The method essentially comprises circulating the polyphasic fluid through the neck of a venturi delimited by the conduit. The method further comprises estimating the first flow rate and the second flow rate by using a measured pressure difference of the fluid through the neck and a property representative of the relative surface occupied by the gas phase relative to a total surface over a cross-section of the neck. The step of estimating the first flow rate and the second flow rate further comprises (a1) calculating an amount representative of the liquid phase present in the gas rich core relative to the total amount of liquid phase in the neck and calculating the first and second flow rate as a function of the amount representative of the liquid phase present in the core calculated during step (a1).

12 Claims, 5 Drawing Sheets

(56) References Cited

U.S. PATENT DOCUMENTS

| | | | |
|---|---|---|---|
| 7,717,000 B2 * | 5/2010 | Xie et al. | 73/863.03 |
| 2006/0236779 A1 | 10/2006 | Atkinson | |
| 2008/0223146 A1 * | 9/2008 | Atkinson et al. | 73/861.04 |
| 2010/0191481 A1 * | 7/2010 | Steven | 702/47 |

* cited by examiner

METHOD FOR DETERMINING THE FLOW RATES OF A FIRST GAS PHASE AND AT LEAST ONE SECOND LIQUID PHASE PRESENT IN A POLYPHASIC FLUID

CROSS-REFERENCE TO RELATED APPLICATIONS

The present application is based on and claims priority to International Application No. PCT/FR2009/051806, filed 24 Sep. 2009, which is based on and claims priority to French Patent Application No. 0856466, filed 25 Sep. 2008. The entire contents of each are hereby incorporated herein by reference.

TECHNICAL FIELD

The present disclosure relates to a method for determining the first flow rate of a gas phase and the second flow rate of at least one liquid phase present in a polyphasic fluid circulating in a conduit.

BACKGROUND

During the exploitation of a well with view to producing hydrocarbons, it is known how to measure the flow rate of fluid extracted from the well in order to be able to control the amount and quality of the production.

However, the measurement of the fluid flow rate is complicated by the nature of the extracted fluid, which is generally polyphasic, with a gas phase and a liquid phase flowing at different rates.

It is therefore necessary for the operator of the well to determine the overall fluid flow rate flowing through the conduit and if possible, the individual volume flow rates of each phase flowing in the conduit.

SUMMARY OF THE DISCLOSURE

According to at least one aspect of the present disclosure, the method for determining the first flow rate of a gas phase and the second flow rate of at least one liquid phase present in a polyphasic fluid comprises the steps of:
- circulating the polyphasic fluid through a neck of a venturi delimited by a conduit, the polyphasic fluid substantially forming a gas rich core and a liquid-rich shell in the neck,
- measuring a pressure difference of the fluid through the neck;
- measuring a property representative of the relative surface occupied by the gas phase relative to a total surface over a cross-section of the neck;
- estimating the first flow rate and the second flow rate by using the measured pressure difference and the property representative of the relative surface occupied by the measured gas phase.

Such a method is intended to be applied in a polyphasic flow-meter. Such a flow-meter is notably used for characterizing the flow of a fluid extracted from a well made in the subsoil, like a well for producing hydrocarbons.

For this purpose, a polyphasic flow-meter of the type described in application US2006/0236779 can be used. Such a flow-meter comprises a venturi, a pressure tap through the venturi, and an apparatus for estimating the overall gas section present in a total section of the neck of the venturi. The flow-meter further comprises a computer for estimating the individual flow rates of the liquid phase and of the gas phase on the basis of measurements of pressure difference through the neck, of the measured or estimated relative surface, and on a calculation model. Such a flow-meter is efficient when the fluid contains a sufficiently large amount of liquid phase.

However, when the volume ratio of the gas phase over the total volume (GVF) is very high, notably when this ratio is greater than 90%, the accuracy of the flow-meter is degraded, in particular for the liquid flow. In this type of state of flow designated by the term of wet gas, the liquid phase is generally distributed in the form of an annular shell in contact with the wall of the conduit and the gas phase circulates at a greater rate in a central core delimited by the annular shell.

In one aspect of the present disclosure, a method is presented for determining the flow rates of a gas phase and of a liquid phase circulating through a polyphasic flow-meter which is very accurate, notably when the gas phase is a large majority.

For this purpose, the method may be characterized in that the step for estimating the first flow rate and the second flow rate comprises the following phases, or steps:
(a1) calculating an amount representative of the liquid phase present in the gas rich core relatively to the total amount of liquid phase in the neck depending on at least one amount representative of the flow of the polyphasic fluid in the neck and a first set of parameters depending on the geometry of the venturi and independent of the first flow rate and of the second flow rate,
(a2) calculating the first flow rate and the second flow rate as a function of the amount representative of the liquid phase present in the core calculated during step (a1).

The method according to the present disclosure may comprise one or more of the following features:
- the representative amount of the flow of the fluid circulating in the neck depends on the Weber number of the polyphasic fluid, and step (a1) comprises the calculation of the Weber number of the polyphasic fluid circulating in the neck;
- step (a1) may comprise the calculation of a corrected Weber number depending on the Weber number of the polyphasic fluid, and on the Reynolds number of the essentially liquid shell, the corrected Weber number forming the representative amount of the flow of the polyphasic fluid circulating in the neck;
- the method may comprise a preliminary step for calibrating the first set of parameters comprising the following phases:
(b1) successively putting into circulation through the neck, a plurality of polyphasic fluid samples having a first known gas phase flow rate and a second known liquid phase flow rate, each sample having at least a first flow rate and a second flow rate distinct from the other samples,
(b2) for each polyphasic fluid sample, calculating said or each amount representative of the flow of the polyphasic fluid in the neck, and the amount representative of the liquid phase present in the essentially gaseous core relatively to the total amount of liquid phase in the neck independently of said or each amount representative of the flow of the polyphasic fluid in the neck;
(b3) performing correlation between the representative amount of the liquid phase present in the essentially gaseous core relatively to the total amount of liquid phase in the neck and said or each amount representative of the flow of the polyphasic fluid in the neck in order to determine the parameters of the first set of parameters;
- the step for estimating the flow rates may comprise:
(c1) calculating a representative amount of the friction coefficient of the essentially liquid shell on the wall delimiting the venturi depending on a representative amount of the flow of the essentially liquid shell on the wall and of a second set of parameters depending on the geometry of the venturi and independent of the first flow rate and of the second flow rate;

the representative amount of the flow of the essentially liquid shell is calculated as a function of the Reynolds number of the essentially liquid shell;

step (b3) may comprise:

for each polyphasic fluid sample, the calculation of the representative amount of the flow of the essentially liquid shell on the wall and of the friction coefficient of the essentially liquid shell on the wall, independently of the representative amount of the flow of the essentially liquid shell on the wall, the determination of the parameters of the second set;

the calculation of the representative amount of liquid phase in the essentially gaseous core as a function of the representative amount of the friction coefficient of the essentially liquid shell on the wall; and the adjustment of the parameters of the first set of parameters for minimizing the error on the correlation between the representative amount of the liquid phase present in the essentially gaseous core relatively to the total amount of liquid phase in the neck and said or each representative amount of the flow of the polyphasic fluid in the neck;

the step for estimating the flow rate comprises (c1) the calculation of a representative amount of the friction coefficient and the interface between the essentially gaseous core and the essentially liquid shell as a function of a representative amount of the flow of the essentially gaseous core in the neck, and of a second set of parameters depending on the geometry of the venturi and independent of the first flow rate and of the second flow rate;

the calculation of the friction coefficient at the interface comprises the calculation of a simplified friction coefficient from the third set of parameters and from the Reynolds number of the essentially gaseous core in the neck and the calculation of a corrected friction coefficient representative of the irregularities of the interface between the liquid-rich shell and the essentially gaseous core on the basis of the simplified friction coefficient and of a fourth set of parameters;

the step for estimating the first flow rate and the second flow rate comprises the calculation of a total mass flow rate through the venturi, depending on an overall density of polyphasic fluid, corrected as a function of the representative amount of liquid phase in the gas-rich core calculated in step (a1);

the step for calculating the total mass flow rate comprises a step for calculating a constant proportional to the square root of the product of the corrected overall density and of an amount representative of the measured pressure difference, the constant being calculated as a function of the representative amount of the liquid phase present in the essentially gaseous core relatively to the total amount of liquid phase in the neck calculated during step (a1), and a representative amount of the friction coefficient between the wall and the essentially liquid shell; and the constant is further calculated depending on a representative amount of the compressibility of the essentially gaseous core circulating in the neck.

BRIEF DESCRIPTION OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labelled in every drawing.

DETAILED DESCRIPTION

In all the following, the terms "upstream" and "downstream" are meant relatively to the normal flow direction of a fluid in a conduit.

Figure 1:
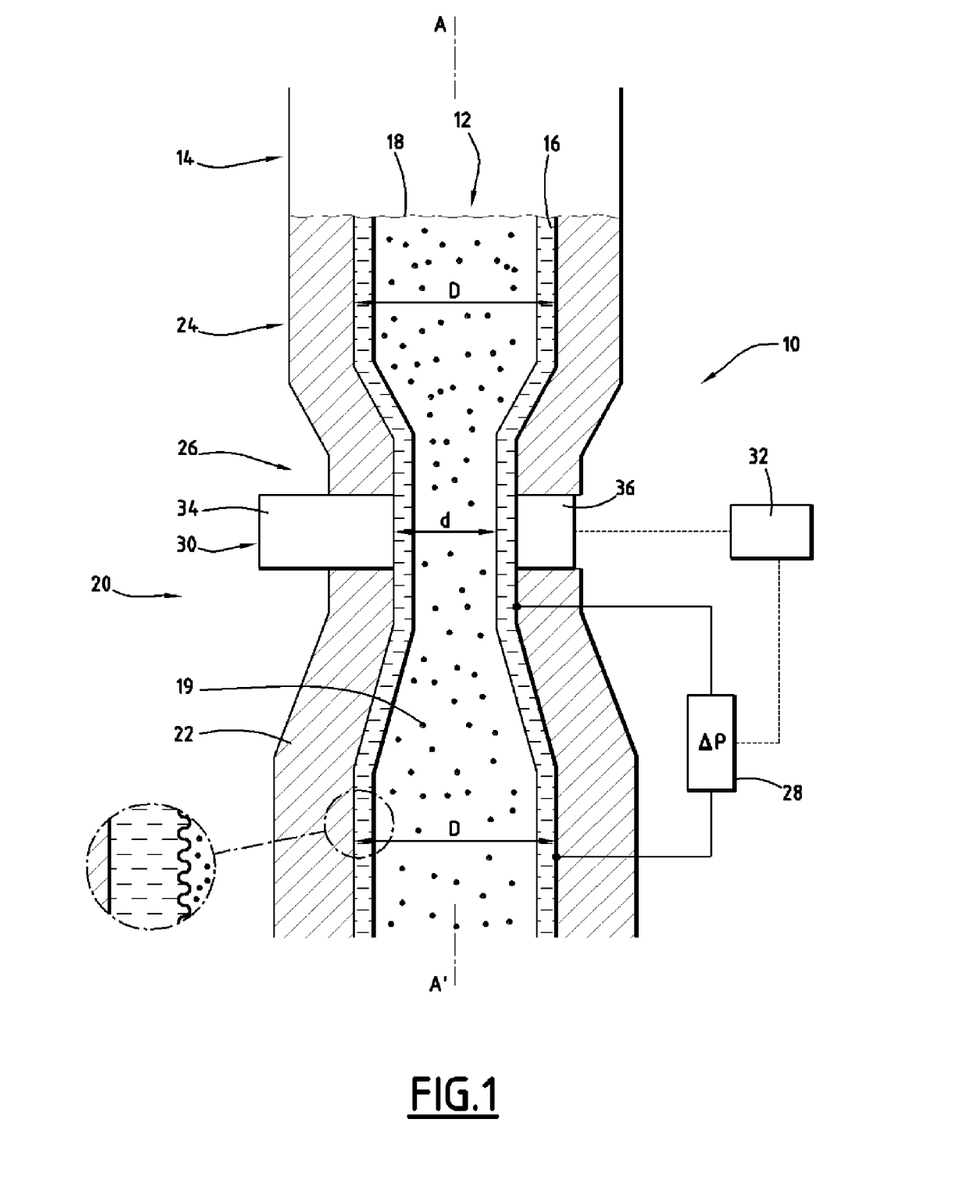
FIG. 1 is a sectional view along a median vertical plane of the venturi of the first polyphasic flow-meter in accordance with an exemplary embodiment disclosed herein.

FIG. 1 illustrates a device 10 for measuring the flow rate of a fluid 12 flowing in a conduit 14 of a fluid exploitation installation such as a well for producing hydrocarbons.

The fluid 12 comprises a liquid phase and a gas phase. In this example, the volume ratio of the gas phase to the total volume of the fluid 12 flowing in the conduit 14, designated by the term of "Gas Volume Fraction" or GVF is advantageously greater than 90%. The fluid 12 thus comprises an essentially liquid annular shell 16 flowing at the contact of the wall delimiting the conduit 14 and an essentially gaseous core 18 flowing at the centre of the shell 16. These conditions are generally designated by the term of "annular flow".

The conduit 14 for example extends vertically at the outlet of a well of the hydrocarbon exploitation installation (not shown). The fluid 12 flows in the conduit 14 along a vertical axis A-A' facing the device 10. The essentially gaseous core 18 contains a portion of the liquid phase, notably as droplets 19 dispersed in the gas.

The conduit 14 delimits, in the vicinity of the measurement device 10, a venturi 20 comprising an upstream lower section 22 of inner diameter D, a downstream upper section 24 with an inner diameter substantially equal to D and, between the upstream section 22 and the downstream section 24, a venturi neck 26 with a diameter d smaller than D. The ratio β of the diameter d to the diameter D is for example comprised between 0.4 and 0.8.

The measurement device 10 comprises a sensor 28 for measuring the differential pressure Δp of the fluid between the upstream portion 22 and the neck 26, a sensor 30 for measuring the overall hold up of gas $\Gamma_g$ and a computer 32 capable of estimating the total mass flow rate of the fluid ωt passing through the conduit 14 and the individual volume flow rates $q_g$, $q_l$ of the gas phase and of the liquid phase, on the basis of a calculation model.

The sensor 30 for measuring the overall hold up of gas $\Gamma_g$, also designated by the term of "gas hold-up" comprises in this example a γ ray emission source 34 placed on one side of the conduit 14 in the neck 26 and a detector 36 for receiving the γ rays after their passing through the neck 26 into the fluid. The detector 36 is placed facing the source 34 on another side of the conduit 14. The γ rays emitted by the source transversely pass through the fluid 12 between the source 34 and the detector 36.

The sensor 30 provides the possibility of determining the overall linear gas hold up $\Gamma_g$ corresponding to a homogeneous fluid flow by the equation (1) below:

$$\Gamma_g = \frac{1}{\lambda_g - \lambda_l}\left[\frac{1}{d}\ln\left(\frac{n_0}{n}\right) - \lambda_l\right] \quad (1)$$

wherein $n_0$ is the number of counts measured in an empty pipe in the absence of fluid, n is the number of counts received by the detector 36, $\lambda_g$ is the linear attenuation of the pure gas, and $\lambda_l$ is the linear attenuation of the pure liquid.

The computer 32 contains a model for calculating the first volume flow rate $q_g$ of the gas phase flowing through the conduit 14, the second volume flow rate $q_l$ of the liquid phase flowing through the conduit 14, on the basis of the measured pressure difference $\Delta p$, and of the overall linear gas hold up $\Gamma_g$, obtained by the sensors 28, 30.

As described in more detail below, the model is based on the calculation of the dispersed fraction $e_d$ of the liquid phase in the essentially gaseous core 18. This fraction $e_d$ is the ratio of the mass flow rate of the liquid which flows in the core 18 to the total mass flow rate of liquid which flows in the conduit 14.

According to an embodiment of the present disclosure, the ratio $e_d$ is calculated as a function of a representative amount of the flow of the polyphasic fluid 12, and to a first set of parameters $p_3$, $p_4$ which depend on the geometrical configuration of the venturi 20, independently of the liquid flow rates $q_l$ and of the gas flow rate $q_g$ passing through the conduit 14, by a first equation linking these quantities.

Advantageously, the ratio $e_d$ is calculated by the equation (2) below, $$e_d = p_3 \times \log(We') + p_4 \quad (2)$$

wherein $p_3$ and $p_4$ are the parameters of the first set of parameters, and ($W_e'$) is a modified Weber number which depends on the Weber number (We) of the fluid 12 flowing in the neck 26, on the Reynolds number $Re_f$ of the essentially liquid shell 16 and on an adimensional density difference parameter $\epsilon_p$, as defined by equation (3) and equation (4).

$$We' = We \times \epsilon_p^{-3/2} \times Re_f^{1/2} \quad (3)$$

$$\epsilon_p = (\rho_l - \rho_g)/\rho_l \quad (4)$$

wherein $\rho_l$ is the density of the liquid phase and $\rho_g$ is the density of the gas phase.

The Weber number (We) is defined by the equation:

$$We = \frac{2r\rho_c j_g^2}{\sigma} \quad (4\text{ bis})$$

wherein r is the upstream radius of the venturi, $\sigma$ is the surface tension between the gas and the liquid, $\rho_c$ is the density of the core 18 and $j_g$ is the surface velocity of the gas.

The model further advantageously comprises the calculation of a wall friction coefficient $c_w$ which depends on a representative amount of the flow of the shell 16 in the neck 26, advantageously on the Reynolds number $Re_f$ of the shell 16, and on a second set of parameters $p_5$, $p_6$ which depend on the geometrical configuration of the venturi 20, independently of the liquid flow rate $q_l$ and gas flow rate $q_g$ passing through the conduit 14, by a second equation linking these quantities.

Advantageously, the wall friction coefficient $C_w$ is calculated by the equation (5).

$$\log(c_w) = p_5 \times \log(Re_f) + p_6 \quad (5)$$

The Reynolds number of the shell is given by the equation:

$$Re_f = \frac{2r\rho_l u_f}{\eta_l} \quad (5\text{ bis})$$

wherein r is the radius of the neck of the venturi, $u_f$ is the average velocity of the film and $\eta_l$ is the dynamic viscosity of the liquid.

The model further comprises the calculation of a gas friction coefficient $c_g$ which depends on an amount representative of the flow of the core 18, advantageously on the Reynolds number $Re_c$ of the gaseous core, and on a third set $p_1$, $p_2$ of parameters which depend on the geometrical configuration of the venturi 20, independently of the liquid flow rate $q_l$ and gas flow rates $q_g$ passing through the conduit 14, by a third equation linking these quantities.

Advantageously, the coefficient $C_g$ is calculated by the equation (6).

$$\log(c_g) = p_1 \times \log(Re_c) + p_2 \quad (6)$$

The Reynolds number of the core is given by the equation:

$$Re_c = \frac{2\rho_c h_c (u_c - u_f)}{\eta_c} \quad (6\text{ bis})$$

wherein $\rho_c$ is the density of the core, $h_c$ is the radius of the core upstream from the venturi, $u_c$ is the average velocity of the core, $u_f$ is the average velocity of the film, and $\eta_c$ is the dynamic viscosity of the core.

In an advantageous embodiment, the model takes into account instabilities at the interface between the core 18 and the shell 16. In this embodiment, a friction coefficient $C_i$ at the interface between the core 18 and the shell 16 is calculated by an equation linking it to the friction coefficient of the gaseous core $c_g$ through a fourth set of parameters $w_1$, $w_2$ which depend on the geometrical configuration of the venturi 20, independently of the liquid flow rates $q_l$ and gas flow rates $q_g$ passing through the conduit 14, through a fourth equation linking these quantities.

Advantageously this equation is defined below by:

$$\frac{c_1}{c_2} = 1 + w_1 \sqrt{\frac{h_f}{d}} \left(\frac{u_g}{u_{gc}}\right)^{w_2} \quad (7)$$

wherein $h_f$ is the film height in the neck 26, d is the diameter of the neck 26, $u_g$ is the overall velocity of the gas in the core 18 and $u_{gc}$ is a critical gas velocity required for initiating wide irregular amplitude waves at the interface, as illustrated in the enlargement of FIG. 1.

The model present in the computer 32 is further based on writing a simplified sliding law which results from the equilibrium between the transfer of momentum at the interface between the core 18 and the shell 16, on the one hand, and the transfer of momentum at the interface between the shell 16 and the wall of the conduit 14, on the other hand, while neglecting the inertia and gravity terms.

This law may be written according to the equation:

$$c_w \frac{x_f^2}{\alpha_f^2 \rho_l} = c_i \frac{\rho_c}{\sqrt{\alpha_c}} \left( \frac{x_c}{\rho_c \alpha_c} - \frac{x_f}{\rho_l \alpha_f} \right)^2 \quad (8)$$

wherein $x_f$ is the ratio of the liquid mass flow rate $\omega_f$ in the shell 16 to the total mass flow rate $\omega_t$ of fluid flowing in the conduit 14 and $x_c$ is the ratio of the mass flow rate $\omega_c$ of liquid in the core 18 to the total mass flow rate $\omega_t$ of fluid flowing in the conduit 14, $\alpha_c$ is the effective hold up of the core and $\alpha_f$ is the effective hold up of the film. The ratios of mass flow rates $x_f$, $x_c$ themselves depend on the coefficient $e_d$, as this will be seen below.

An exemplary method for determining the flow rate $q_g$, $q_l$ according to the present disclosure will now be described with reference to FIGS. 2 to 5. This method initially comprises a calibration phase, illustrated by FIGS. 2 and 3 for determining the parameters $p_1$ to $p_6$, $w_1$ and $w_2$, for the given geometry of the conduit 14 on the basis of fluid samples with known flow rates. The method then comprises a phase for continuous measurement of the respective unknown individual flow rates $q_l$ and $q_g$ of the gas phase and of the liquid phase of a fluid 12 flowing in the conduit 14, illustrated by FIGS. 4 and 5.

In the calibration phase, a plurality of samples i of polyphasic fluids 12 preferably having a GVF ratio of more than 90% and a plurality of known liquid flow rates $q_l(i)$ and a plurality of known gas flow rates $q_g(i)$ are introduced into the conduit 14 so as to pass through the flow-meter device 10. For each known sample i, the respective density $\sigma_l(i)$, $\sigma_g(i)$ of the liquid phase and of the gas phase are determined experimentally as well as the dynamic viscosities $\eta_l(i)$, $\eta_g(i)$.

Figure 2:
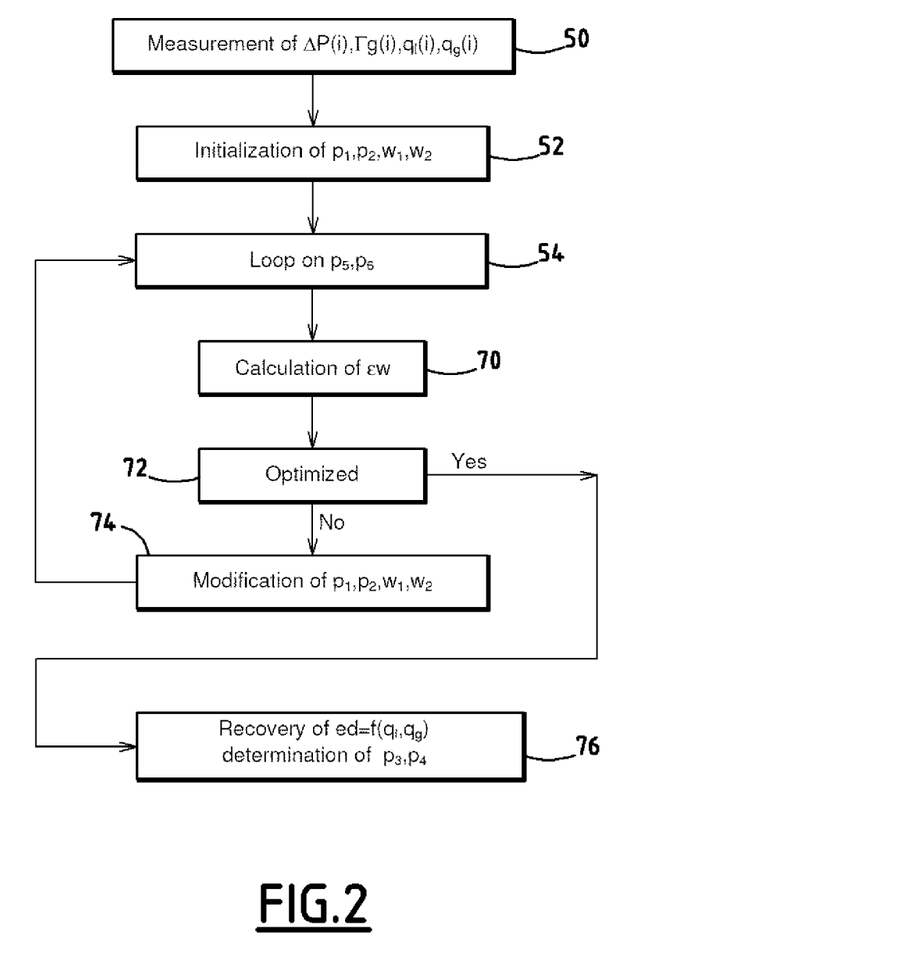
FIG. 2 is a flow chart describing the main steps of the calibration phase in accordance with an exemplary embodiment disclosed herein.

Next, as illustrated in step 50 in FIG. 2, a measurement of the pressure difference $\Delta p(i)$ is carried out with the sensor 28 and a measurement of homogeneous gas hold up $\tau_g(i)$ is carried out with the sensor 30, for each sample corresponding to a known pair $q_l(i)$, $q_g(i)$.

Then, the parameters $p_1$ to $p_6$ and $w_1$, $w_2$ common to the whole of the samples, are determined by the computer 32. For this purpose, in step 52, the parameters of the third set $p_1$, $p_2$, and of the fourth set $w_1$, $w_2$ as defined in equations (5) and (6) and (7) are reset to a selected initial value. These values for example are $p_1=-1$, $p_2=-0.5$, $w_1=0$, $w_2=1$. The values of $c_i$ and $c_w$ are also reset to a given value for example equal to 0.005.

Figure 3:
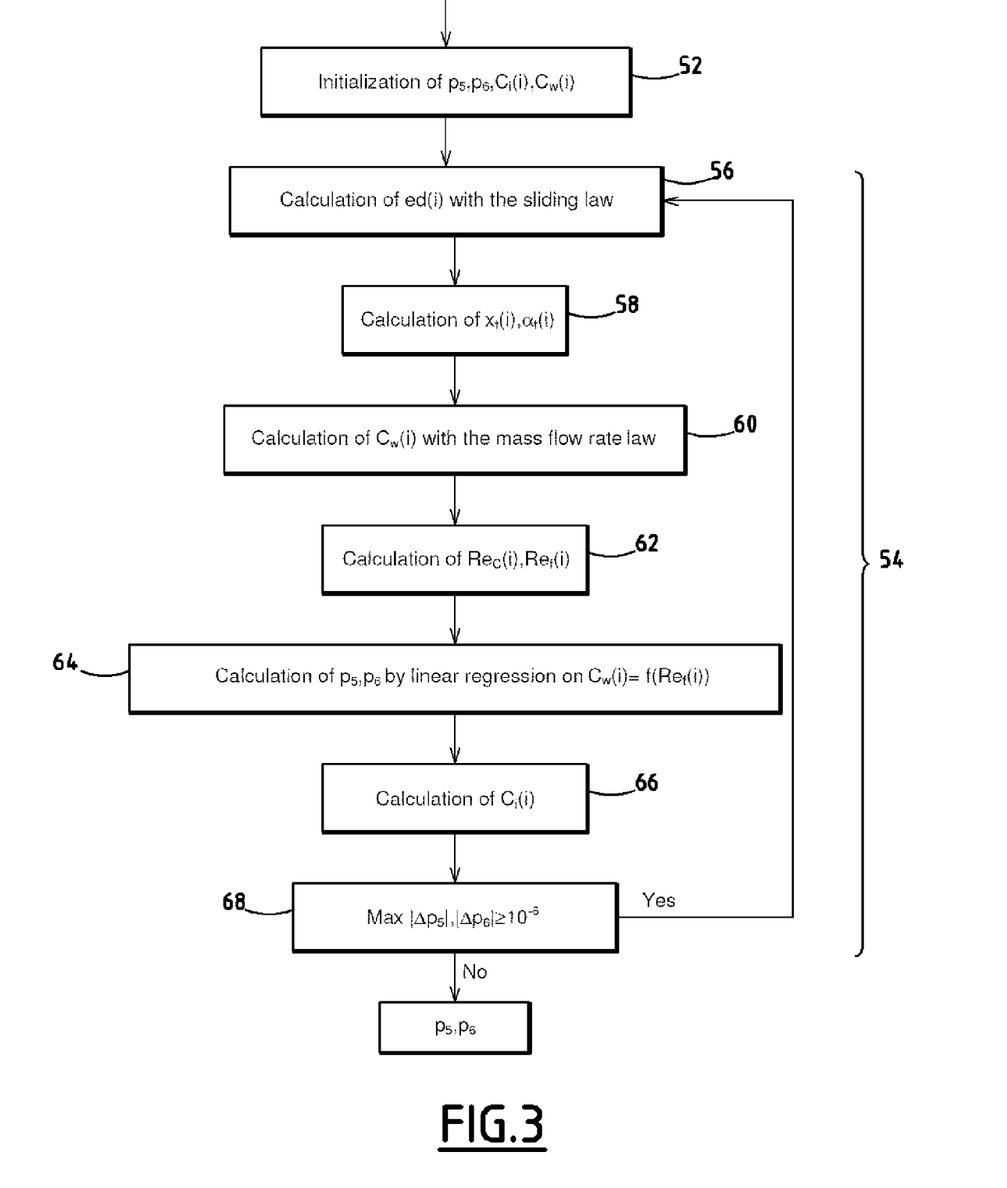
FIG. 3 is a detailed flow chart of a particular step of the calibration phase described in the flow chart of FIG. 2.

Next, in step 54, an iterative loop for optimizing the parameters $p_5$, $p_6$ of the second set is performed, as illustrated by FIG. 3. At each iteration, the loop 54 comprises in step 56, a step for calculating the ratio $e_d(i)$ by a sliding law for each pair of flow rates $(q_l(i); q_g(i))$ As stated earlier, this sliding law is based on the equilibrium between the mass transfers between the interface and the wall according to equation (8).

In equation (8), the ratios $x_f$ and $x_c$ are defined by the equations:

$$x_f = \omega_f / \omega_t \quad (9)$$

and $$x_c = \omega_c / \omega_t \quad (10)$$

$\alpha_c$ is the effective hold up of the gas in the core 18 as defined by the equation:

$$\alpha_c = \alpha_g \left( 1 + e_d \frac{q_l}{q_g} \right) = \alpha_g \left( 1 + \frac{e_d}{Q_g} \right) \quad (11)$$

and $\rho_c$ is given by the equation:

$$\rho_c = \rho_g \left( 1 + e_d \frac{1 - e_d \frac{\rho_g}{\rho_l}}{\frac{\omega_g}{\omega_l} + e_d \frac{\rho_g}{\rho_l}} \right) = \rho_g \left( 1 + e_d \frac{1 - e_d R_g}{X_g + e_d R_g} \right) \quad (11\text{ bis})$$

wherein $\alpha_g$ is calculated from the gas hold up $\Gamma_g$ in a homogeneous fluid by the equation (12).

$$\alpha_g = \Gamma_g^2 \cdot \left( 1 + e_d \left( \frac{q_l}{q_g} \right) \right) = \Gamma_g^2 \left( 1 + \frac{e_d}{Q_g} \right) \quad (12)$$

On this basis, equation (8) may be written according to the equation $$\frac{c_w}{c_i} = \sqrt{\frac{1 + 1/A_g}{1 + e_d/Q_g}} \cdot \frac{e_d + R_g Q_g}{e_d + Q_g} \cdot \left( \frac{Q_g/A_g - e_d}{1 - e_d} - 1 \right)^2 \quad (12 \text{ bis})$$

wherein $Q_g$ is the ratio of the flow rates defined by the equation $$Q_g = q_g/q_l \quad (12\text{ter})$$

$A_g$ is the ratio of the hold ups as defined by the equations $$A_g = \alpha_g/\alpha_l \quad (13)$$

$$A_g = \frac{\Gamma_g^2(1 + e_d/Q_g)}{1 - \Gamma_g^2(1 + e_d/Q_g)} \quad (13\text{ bis})$$

$R_g$ is the ratio defined by the equation:

$$R_g = \rho_g/\rho_l \quad (14)$$

and $N_g$ is the ratio defined by equation (15), $$N_g = \eta_g/\eta_l \quad (15)$$

wherein $\eta_g$ is the dynamic viscosity of the gas and $\eta_l$ is the dynamic viscosity of the liquid.

Once $e_d(i)$ is calculated for each pair of known values $q_g(i)$, $q_l(i)$ the amount $x_f$ and the amount $\alpha_f$ are calculated in step 58.

For this purpose, the amount $x_f$ is determined by the equation:

$$x_f = x_l \times e_d = \frac{\omega_l}{\omega_t} \cdot e_d = \frac{1 - e_d}{1 + R_g \cdot Q_g} \quad (16)$$

and the amount $\alpha_f$ is determined by the equation:

$$\alpha_f = 1 - \alpha_c \quad (16\text{bis})$$

wherein $\alpha_c$ is calculated by equation (11) and $\alpha_g$ is calculated by equation (12).

This having been done, for each sample I, in step 60, the quantity $c_w(i)$ is calculated from the equation:

$$\omega_t = C \cdot \varepsilon \cdot a_1 \cdot \sqrt{\frac{2\tilde{\rho}}{1-\beta^4} \Delta p'} \quad (17)$$

for each sample i, which links the total flow rate $\omega_t$ of fluid in the conduit 14, to a corrected pressure difference $\Delta p'$, to an estimated global density $\tilde{\rho}$, via a proportionality constant $C \cdot \varepsilon$ at the section of the neck $a_1$.

This equation results from the integration of the Navier Stokes equations over the length of the venturi.

Equation (18) gives the estimated global density $\tilde{\rho}$ as a function of $x_f$ and of $x_c$, $$\frac{1}{\tilde{\rho}} = \frac{x_f^2}{\rho_l \alpha_f} + \frac{x_c^2}{\rho_c \alpha_c} \quad (18)$$

Equation (19) gives the dynamic pressure difference $\Delta p'$ as a function of the measured pressure difference $\Delta p$ and of a corrective parameter in order to take gravity into account.

$$\Delta p' = \Delta p + (\alpha_f \rho_l + \alpha_c \rho_c) g \Delta z \quad (19)$$

Equation (20) gives the proportionality constant in which C is the discharge coefficient and $\varepsilon$ is the compressibility factor.

$$\left(\frac{1}{C \cdot \varepsilon}\right)^2 = 1 + \frac{1}{1-\beta^4}\left(c_\omega \kappa_\omega \frac{x_f^2}{\alpha_f^2} \frac{\tilde{\rho}}{\rho_l} + \xi_g \frac{\tilde{\rho}}{\rho_{g,0}}\right) \quad (20)$$

In these equations, $\Delta z$ is the height between two points of the pressure tap 28 and $\kappa_w$ is the surface of the wall divided by the volume of the venturi and $\rho_{g,0}$ is the density of the gas upstream from the venturi.

The term $\xi_g$ is defined by equation (21) in order to take into account the compressibility of the gas during its passing through the neck.

$$\frac{\xi_g}{a_1^2 \rho_{g,0}} = \beta^4 \frac{\delta_P}{\kappa} \frac{x_c^2}{\alpha_c} \frac{X_g}{X_g + e_d} \int_1^{1/\beta^4} \frac{-t \cdot dt}{[1-\delta_P(1-t)]^{1+1/\kappa}} \quad (21)$$

wherein:

$$X_g = \omega_g / \omega_l \quad (22)$$

$$\delta_p = (1-p_1/p_2)/(1/\beta^4 - 1) \quad (23)$$

The term $\kappa$ is the polytropic coefficient calculated with the gas and liquid mass flow rates $\omega_g$, $\omega_l$, the specific capacities of the gas and of the liquid $c_{v,g}$, $c_{v,l}$, and the isentropic exponent $\gamma$ from equation (24), and the terms $p_1$ and $p_0$ are the respective pressures at the neck and upstream from the neck.

$$\kappa = \frac{\omega_g c_{v,g} \gamma + \omega_l c_{v,l}}{\omega_g c_{v,g} + \omega_l c_{v,l}} \quad (24)$$

Once $c_w(i)$ is calculated for each pair $q_l(i)$, $q_c(i)$, the Reynolds numbers $Re_c(i)$ of the core 18 and $Re_f(i)$ of the shell 16 are calculated in step 62.

The Reynolds number $Re_c(i)$ of the core is calculated as a function of $e_d$ by the equation:

$$Re_c = \frac{2}{\pi r_0} \frac{\rho_g}{\eta_g} q_g \frac{Q_g R_g + e_d}{Q_g R_g + e_d / N_g} \cdot \frac{Q_g R_g + e_d}{Q_g R_g + e_d R_g} \cdot \frac{1}{\Gamma_g^2 (1 + e_d / Q_g)} \quad (25)$$

The Reynolds number $Re_f(i)$ of the shell 16 is calculated for each sample pair i as a function of $e_d$ by the equation:

$$Re_f = \frac{2}{\pi r_0} \frac{\rho_l}{\eta_l} q_l (1-e_d) \frac{1/A_g - e_d/Q_g}{1 + 1/A_g} \quad (26)$$

wherein $r_0$ is the upstream radius of the neck.

A plurality of pairs $(c_w(i); Re_f(i))$ associating the friction coefficient of the shell on the wall of the conduit 14 with the Reynolds number of the shell are obtained.

In step 64, a linear regression is made on the equation:

$$\log(c_w) = p_5 \times \log(Re_f) + p_6 \quad (27)$$

for calculating the coefficient for $p_5$ and $p_6$ on the basis of the pairs $(c_w(i); Re_f(i))$ associated with each pair of flow rates.

Next, in step 66, the coefficient $c_i(i)$ is calculated by the equation (12 bis) as a function of $Re_c(i)$, $e_d(i)$ $Q_g(i)$, et $\Gamma_g(i)$. For this purpose $Re_c(i)$ is calculated as a function of $e_d(i)$ and of $Q_g(i)$ by equation (25). Next, the coefficient $c_g(i)$ is calculated on the basis of the correlation of equation (6) as a function of $Re_c(i)$ and of coefficients $p_1$ and $p_2$.

Next, with equation (11), the coefficient $\alpha_c$ is calculated. The coefficient $$\sqrt{\frac{h_f}{d}}$$

is then determined by the equation:

$$\sqrt{\frac{h_f}{d}} = \sqrt{\frac{1 - \sqrt{\alpha_c}}{2}} \quad (27 \text{ bis})$$

The coefficient $c_i(i)$ is then calculated on the basis of the coefficients $w_1$ and $w_2$ and of equation (7).

In step 68, the differences $|\Delta p_5|$ and $|\Delta p_6|$ between the coefficients $p_5$ and $p_6$ obtained in step 64 during this iteration of the loop 54 and those obtained during the preceding iteration of the loop are calculated.

If at least one of the differences $|\Delta p_5|$ and $|\Delta p_6|$ is greater than a given convergence coefficient, for example $10^{-6}$, a new iteration is carried out by returning to step 56. If the value of each of these differences is less than the given convergence coefficient, the loop 54 is completed and step 70 is applied. In step 70, the error $\varepsilon_w$ committed on the coefficient $c_w$ during the linear regression made in step 64 is estimated.

This error $\varepsilon_w$ is for example calculated by equation (28).

$$\varepsilon_w = \frac{1}{N} \sqrt{\sum_{i=1}^{N} \log(C_{w,i}) - (p_5 \times \log(Re_{f,i}) + p_6)} \quad (28)$$

In step 72, an optimization test of this error $\varepsilon_w$ is carried out. If the error $\varepsilon_w$ is always greater than a given optimized value, the coefficients $p_1$, $p_2$, $w_1$ and $w_2$ are modified in step 74, for example by a descent along the gradient.

A new iteration of the loop 54 is then carried out for calculating new coefficients $p_5$, $p_6$, by using the coefficients $p_5$, $p_6$ obtained during the preceding iteration for initializing the loop in step 56. When the error $\epsilon_w$ is less then the given optimized value, the optimization loop 54 of the coefficients $p_1$, $p_2$, $w_1$, $w_2$ is then stopped. The coefficients $e_d(i)$ are then recovered for each flow rate pair $q_l(i)$, $q_g(i)$ and the modified Weber number, $W_e'(i)$ as calculated by equation (3) is calculated on the base of the Weber number determined by means of the equation:

$$We = \frac{2}{\pi^2 r_0^3} \frac{\rho_g}{\sigma} q_g^2 \cdot \frac{Q_g R_g + e_d}{Q_g R_g + e_d R_g} \quad (29)$$

The coefficients $p_3$ and $p_4$ are then calculated by linear regression in step 76.

A complete set of parameters $p_1$ to $p_6$ and $w_1$, $w_2$ is therefore obtained during the calibration phase. This allows the quantities $e_d$, $c_g$, $c_w$, $c_i$ to be calculated as a function of these parameters and of characteristic quantities of the fluid flow through the conduit during a measurement phase, according to the equations (2), (5), (6) and (7), as this will be detailed below.

Once the calibration phase is completed, a measurement phase is carried out with a fluid 12 of unknown flow rate circulating in the conduit 14. This measurement may be carried out periodically at intervals for example comprised between 5 minutes and 15 minutes.

Figure 4:
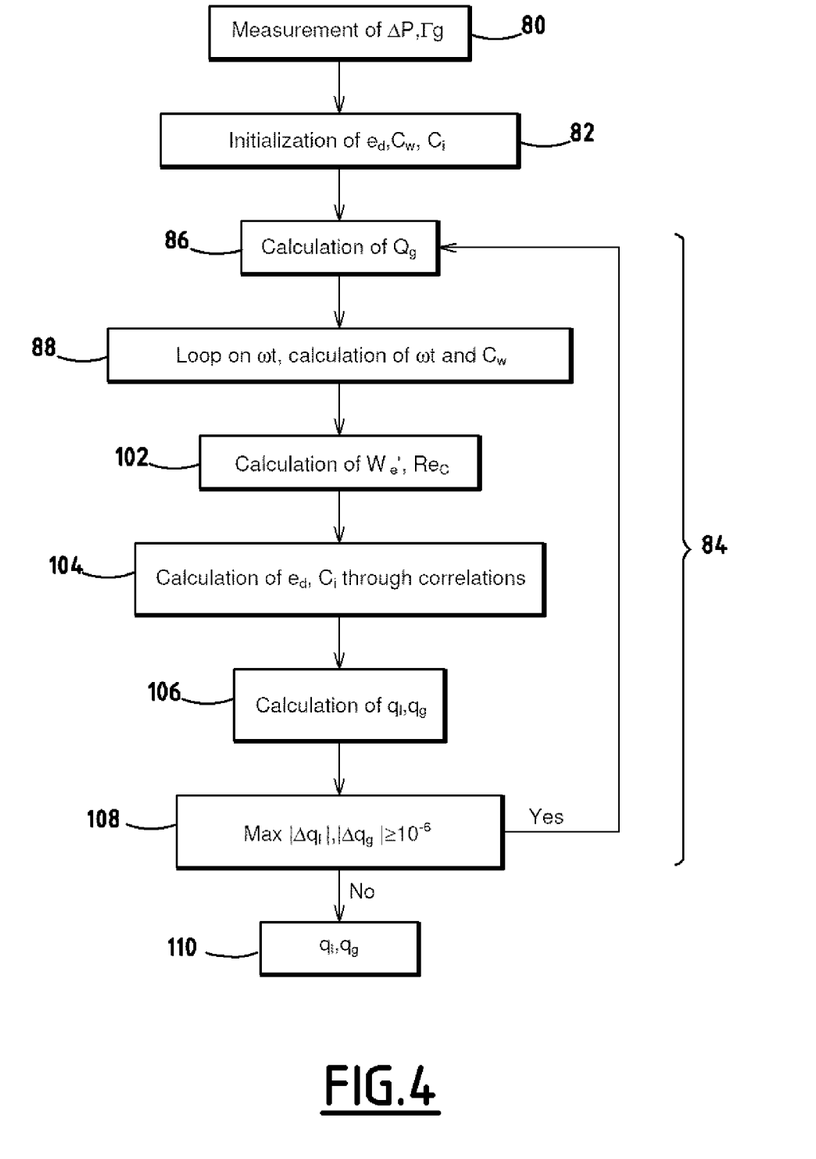
FIG. 4 is a flow chart describing a phase for measuring individual volume flow rates of the gas phase and of the liquid phase during a measurement campaign in accordance with an exemplary embodiment disclosed herein.

As earlier described, the pressure difference $\Delta p$ is measured by the sensor 28 and the overall gas hold up $\Gamma_g$ is calculated by the equation (1) with the measurement made by the sensor 30 in step 80.

Next, the parameters $e_d$, $c_w$ and $c_i$ are initialized by having them assume a value given in step 82. This value is for example equal to 0.5 for $e_d$, 0.05 for $c_w$, and 0.08 for $c_i$ respectively.

Next, a loop 84 of iterations is carried out for determining the respective flow rates $q_l$ and $q_g$. This loop 84 begins by a step for calculating the ratio $Q_g$, as defined by equation (12ter) calculating it on the basis of the equation (12bis), in step 86.

Next, in step 88, an iteration loop is carried out for calculating the total mass flow rate $\omega_t$. This loop 88 is described in FIG. 5. It begins with a phase for calculating $\omega_t$ with equation (17), taken as a combination with equations (18) to (20) (step 90) by using the values of $e_d$, $c_w$, and $c_i$.

Figure 5:
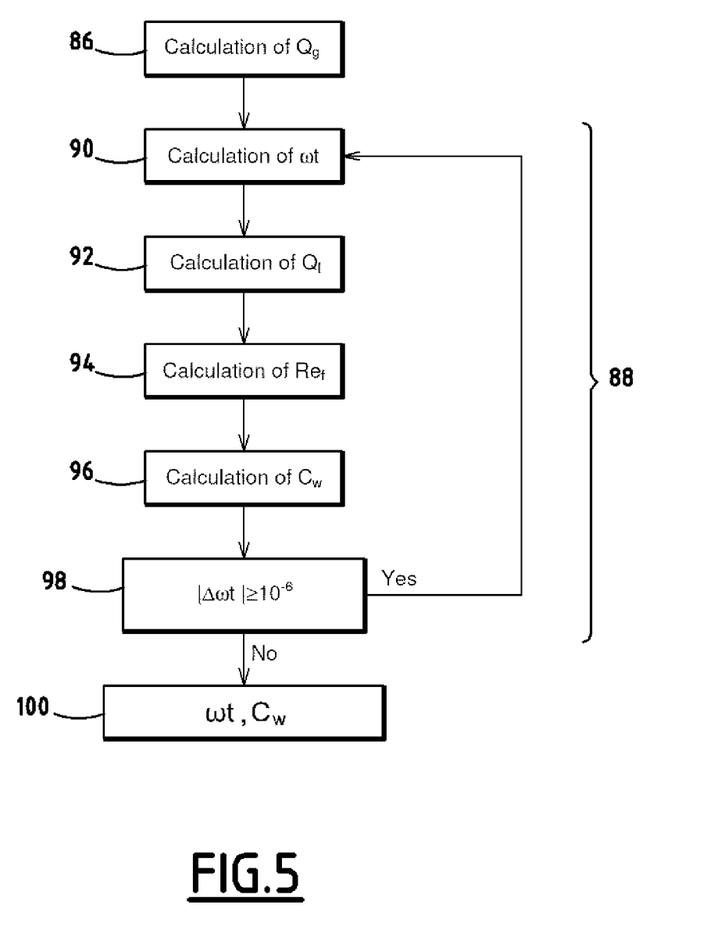
FIG. 5 is a detailed flow chart of a particular step of the measurement phase described in the flow chart of FIG. 4.

In step 92, the liquid volume flow rate $q_l$ is calculated by the equation:

$$q_l = \omega_t/(1+1/(R_g Q_g)) \quad (30)$$

and in step 94, the Reynolds number of the film $Re_f$ is calculated by equation (26).

Next, in step 96, the coefficient $c$, is calculated by equation (5) by using the parameters $p_5$ and $p_6$ determined during the calibration phase.

Next, in step 98, a convergence test is carried out on the difference $|\Delta\omega_t|$ between the value of $\omega_t$ calculated in step 90 during this iteration of the loop 84 and the value $\omega_t$ calculated during the preceding iteration of the loop 84.

If this difference $|\Delta\omega_t|$ is greater than a convergence value given for example as equal to $10^{-6}$, a new iteration is accomplished on the loop 84 by returning to step 90 and by using the value of $c_w$ calculated in step 96. However, if this difference $|\Delta\omega_t|$ is less than the convergence value, the loop 84 is completed and the values of $\omega_t$ and $c_w$ are then extracted in step 100.

Next, with reference to FIG. 4 in step 102, the corrected Weber number We' is calculated by equation (29), taken in combination with equations (3), (4) and (26).

Next, the Reynolds number $Re_c$ of the core 18 is calculated by equation (25), taken in combination with the equation $$q_g = \omega_t/(\rho_l(1+R_g Q_g)) \quad (31)$$

In step 104, the coefficients $e_d$ and $c_i$ are respectively calculated by the correlations defined by equation (2) and by the combination of equations (6) and (7) in which the parameters $p_1$ to $p_6$ and $w_1$, $w_2$ are those calculated during the calibration phase. In step 106, the equations (30), (31) are used for calculating the flow rates $q_g$ and $q_l$. In step 108, a test is carried out on the respective differences $|\Delta q_l|$ and $|\Delta q_g|$ between the values $q_g$, $q_l$ calculated in step 106 during this iteration of the loop 84 and the respective values $q_g$, $q_l$ calculated during the preceding iteration of the loop 84.

If at least one of these differences $|\Delta q_l|$ and $|\Delta q_g|$ is greater than a determined convergence coefficient, for example equal to $10^{-6}$, a new iteration of the loop 84 is carried out by returning to step 86 and by using the new obtained values of $e_d$, $c_w$ and $c_i$. If these differences $|\Delta q_l|$ and $|\Delta q_g|$ are smaller than the given convergence coefficient, the loop 84 is stopped and the coefficient $q_l$ and $q_g$ are extracted so as to be for example displayed by the computer 32, with the value of the overall mass flow rate $\omega_t$.

In a first alternative, the interface between the essentially liquid shell 16 and the essentially gaseous core 18 is considered as smooth. In this case the friction coefficient at the interface $c_i$ is equal to the gas friction coefficient $c_g$ and the parameters $w_1$ and $w_2$ are equal to 0 during all the steps of the method.

In another alternative, the gas compressibility $\xi_g$ in equation (20) is considered as 0 during the whole method, so that equations (21) to (24) are not used. The errors obtained on the total mass flow rate $\omega_t$ and on the individual gas and liquid flow rates $q_g$, $q_l$, for a fluid circulating at a pressure of more than 25 bars in the conduit 14 through the measurement device 10 are summarized in Table 1 below.

TABLE 1

| | | | |
|---|---|---|---|
| Total mass flow rate (wt) | | ±1.6% | |
| Gas volume flow rate ($q_g$) | | ±2.1% | |
| Liquid volume flow rate ($q_l$) | 90%, <GVF <97% ±3.2% | 90%, <GVF <99% ±7% | 90%, <GVF <100% ±10 m³/day |

As illustrated by this table, using a model estimating the ratio $e_d$ of the liquid mass circulating in the core 18 as a function of a number $W_e'$ representative of the flow of the fluid 12 through the conduit 14, it is possible to obtain excellent accuracy on the estimated value of the gas volume flow rate $q_g$ and on the liquid volume flow rate $q_l$, even for high GVF values and close to 100%.

This estimation of the quantity $e_d$, made in combination with the estimation of the friction coefficient at the interface $c_i$ between the core 18 and the shell 16 and of the friction coefficient $c_w$ between the shell 16 and the wall of the conduit 14 also contributes to improving the accuracy of the measurement.

By accurately defining the total mass flow rate $\omega_t$ by equations (18) to (20), it is also possible to better take into account physical phenomena occurring in the conduit 14 for improving the accuracy of the measurement.

What is claimed is:

1. A method for determining a first flow rate ($q_g$) of a gas phase and a second flow rate (q) of at least one liquid phase present in a polyphasic fluid circulating in a conduit, the method comprising:
   circulating the polyphasic fluid through a neck of a venturi delimited by a conduit, the polyphasic fluid forming a gas-rich core and a liquid-rich shell in the neck,
   measuring a pressure difference ($\Delta p$) of the fluid through the neck;
   measuring a property ($\Gamma_g$) representative of the relative surface occupied by the gas phase relative to a total surface over a cross-section of the neck;
   estimating the first flow rate ($q_g$) and the second flow rate ($q_l$) by using the measured pressure difference ($\Delta p$) and the property ($\Gamma_g$) representative of the relative surface occupied by the measured gas phase;
   wherein estimating the first flow rate ($q_g$) and the second flow rate ($q_l$) further comprises:
      (a1) calculating an amount ($e_d$) of the liquid phase present in the gas-rich core relative to the total amount of liquid phase in the neck depending on at least one amount ($W_e'$) representative of the flow of the polyphasic fluid in the neck and a first set of parameters ($p_3$, $p_4$) depending on the geometry of the venturi and independent of the first flow rate ($q_g$) and of the second flow rate (q),
      (a2) calculating the first flow rate ($q_g$) and the second flow rate ($q_l$) as a function of the amount ($e_d$) representative of the liquid phase present in the core calculated during (a1).

2. The method according to claim 1, wherein the amount ($W_e'$) representative of the flow of the fluid circulating in the neck is a function of the Weber number (We) of the polyphasic fluid, and (a1) comprises the calculation of the Weber number (We) of the polyphasic fluid circulating in the neck.

3. The method according to claim 2, wherein (a1) further comprises the calculation of a corrected Weber number ($W_e'$) as a function of the Weber number (We) of the polyphasic fluid, and of the Reynolds number ($Re_f$) of the liquid shell, the corrected Weber number ($W_e'$) forming the amount representative of the flow of the polyphasic fluid circulating in the neck.

4. The method according to claim 1, wherein the method further comprises a preliminary step for calibrating the first set of parameters ($p_3$, $p_4$), wherein the preliminary step comprises:
   (b1) successively circulating through the neck of the venturi a plurality of polyphasic fluid samples having a first known gas phase flow rate ($q_g(i)$) and a second known liquid phase flow rate ($q_l(i)$), each sample having at least one first flow rate or a second flow rate distinct from the other samples;
   (b2) for each polyphasic fluid sample, calculating each amount ($W_e'$) representative of the flow of the polyphasic fluid in the neck, and of the amount ($e_d$) representative of the liquid phase present in the gaseous core relative to the total amount of liquid phase in the neck independently of each amount ($W_e'$) representative of the flow of the polyphasic fluid in the neck; and
   (b3) performing correlation between the amount ($e_d$) representative of the liquid phase present in the gaseous core relatively to the total amount of liquid phase in the neck and each amount ($W_e'$) representative of the flow of the polyphasic fluid in the neck for determining the first set of parameters ($p_3$, $p_4$).

5. The method according to claim 1, wherein estimating the first flow rate ($q_g$) and the second flow rate ($q_l$) further comprises:
   (c1) calculating an amount representative of the friction coefficient ($c_w$) of the liquid shell on the wall delimiting the venturi as a function of an amount ($Re_f$) representative of the flow of the liquid shell on the wall and of a second set of parameters ($p_5$, $p_6$) depending on the geometry of the venturi and independent of the first flow rate and of the second flow rate.

6. The method according to claim 5, wherein the amount ($Re_f$) representative of the flow of the liquid shell is calculated as a function of the Reynolds number of the liquid shell.

7. The method according to claim 4, wherein for each polyphasic fluid sample, (b3) comprises:
   calculating an amount ($Re_f$) representative of the flow of the liquid shell on the wall and of the friction coefficient ($c_w$) of the liquid shell on the wall, independently of the amount ($Re_f$) representative of the flow of the liquid shell on the wall,
   determining a second set of parameters ($p_5$, $p_6$) depending on the geometry of the venturi and independent of the first flow rate and of the second flow rate;
   calculating the amount ($e_d$) representative of the liquid phase in the gaseous core as a function of the amount representative of the friction coefficient ($c_w$) of the liquid shell on the wall;
   adjusting the first set parameters ($p_3$, $p_4$) for minimizing the error in the correlation between the amount ($e_d$) representative of the liquid phase present in the gaseous core relative to the total amount of liquid phase in the neck and each amount ($W_e'$) representative of the flow of the polyphasic fluid in the neck.

8. The method according to claim 1, wherein estimating the first flow rate ($q_g$) and the second flow rate ($q_l$) further comprises:
   (c1) calculating an amount representative of the friction coefficient ($c_i$) at the interface between the gaseous core and the liquid shell as a function of an amount ($Re_c$) representative of the flow of the gaseous core in the neck, and of a third set of parameters ($p_1$, $p_2$) depending on the geometry of the venturi and independent of the first flow rate ($q_g$) and of the second flow rate ($q_l$).

9. The method according to claim 8, wherein the calculation of the friction coefficient at the interface ($c_i$) comprises the calculation of a simplified friction coefficient ($c_g$) from the third set of parameters ($p_i$, $p_2$) and of the Reynolds number ($Re_c$) of the gaseous core in the neck and the calculation of a corrected friction coefficient ($c_i$) representative of the irregularities of the interface between the liquid-rich shell and the gaseous core on the basis of the simplified friction coefficient ($c_g$) and a fourth set of parameters ($w_1$, $w_2$).

10. The method according to claim 1, wherein the step for estimating the first flow rate ($q_g$) and the second flow rate ($q_l$) comprises the calculation of a total mass flow rate ($\omega_t$) through the venturi as a function of an overall polyphasic fluid density ($\bar\sigma$) corrected according to the amount ($e_d$) representative of liquid phase in the gas-rich core calculated in (a1).

11. The method according to claim 10, wherein calculating the total mass flow rate ($\omega_t$) comprises calculating a constant $C\cdot\epsilon$ proportional to the square root of the product of the corrected overall density ($\bar\sigma$) and of an amount representative of the measured pressure difference ($\Delta p$), the constant $C\cdot\epsilon$ being calculated as a function of the amount ($e_d$) representative of the liquid phase present in the gaseous core relative to the total amount of liquid phase in the neck calculated during (a1), and an amount ($c_w$) representative of the friction coefficient between the wall and the liquid shell.

12. The method according to claim 11, wherein the constant $C \cdot \epsilon$ is further calculated as a function of an amount representative of the compressibility ($\xi_g$) of the gaseous core circulating in the neck.

* * * * *